United States Patent [19]

Margolin

[11] Patent Number: 4,674,834
[45] Date of Patent: Jun. 23, 1987

[54] GRAPHIC INPUT OR OUTPUT DEVICE INCLUDING A FIBER OPTIC BUNDLE WITH ELECTRONIC MEANS FOR PROVIDING COHERENCE

[75] Inventor: George D. Margolin, Newport Beach, Calif.

[73] Assignee: Photon Devices, Ltd., Newport Beach, Calif.

[21] Appl. No.: 581,085

[22] Filed: Feb. 17, 1984

[51] Int. Cl.$^4$ .......................... G02B 6/06; G09G 1/26; H01J 5/16; G03B 27/00

[52] U.S. Cl. .............................. 350/96.25; 350/96.24; 350/96.27; 350/96.29; 340/794; 340/798; 340/799; 250/227; 355/1; 358/901

[58] Field of Search ............... 340/789, 794, 795, 797, 340/798, 799; 350/96.10, 96.24, 96.25, 96.26 96.27, 96.29, 96.28, 250/227; 355/1; 358/901 358/901

[56] References Cited

U.S. PATENT DOCUMENTS

| | | | |
|---|---|---|---|
| 3,184,732 | 5/1965 | Haynes | 350/96.28 |
| 3,273,445 | 9/1966 | Siegmund | 350/96.27 X |
| 3,717,762 | 2/1973 | Grenier et al. | 250/227 |
| 4,057,338 | 11/1977 | Yevick | 355/1 |
| 4,060,307 | 11/1977 | Demaine et al. | 350/96.27 X |
| 4,310,754 | 1/1982 | Check, Jr. | 250/227 |
| 4,332,458 | 6/1982 | Hoffman | 355/3 BE |
| 4,549,175 | 10/1985 | Rokunohe et al. | 340/794 |
| 4,570,063 | 2/1986 | De Bie et al. | 350/96.25 |

OTHER PUBLICATIONS

Ciarcia, "Build the Micro D-Cam Solid State Video Camera" Part I Byte Magazine, Sep. 1983, pp. 20-31.
Ciarcia, "Build the Micro D-Cam Solid State Video Camera" Part II Byte Magazine, Oct. 1983, pp. 67-86.
Micron Technology Inc., "Bit Image Sensor" Micron Tech. Publication (no date), pp. 1-12.
Bruce et al., "Fiber Optics Large Scale Read Only Memory" IBM Tech. Disclosure, vol. 4, No. 5, Oct. 1961 pp. 76-77.
Bushor, "Optical Character Readers . . . " Electronics, vol. 35, No. 5, 2/62, pp. 26-27.

Primary Examiner—William L. Sikes
Assistant Examiner—Brian M. Healy
Attorney, Agent, or Firm—Marmorek, Guttman & Rubenstein

[57] ABSTRACT

Coherence of an optical fiber bundle with randomly different geometries at its two ends is achieved electronically. A photosensitive random access memory is used as a sensor array to determine the addresses of fiber at which light exits when light is sequentially directed into consecutive fibers at the other end. The addresses are stored in a ROM and used to provide coherence of an otherwise unordered fiber optic bundle having one end formed in a linear array, for example, and used to scan documents. A printer also is described using electronically acieved coherence.

14 Claims, 16 Drawing Figures

GRAPHIC INPUT OR OUTPUT DEVICE INCLUDING A FIBER OPTIC BUNDLE WITH ELECTRONIC MEANS FOR PROVIDING COHERENCE

REFERENCES

Reference is made to the magazine articles *Build the Micro D-Cam Solid-State Video Camera. Part I*, Byte Magazine, September 1983, pp. 20–31, and *Part II*, in Byte Magazine, October, 1983, pp. 67–86, which are incorporated herein by reference. Reference is also made to a 12 page product description entitled *Micron Technology, Inc. IS32 Optic RAM 32,768 Bit Image Sensor*, also incorporated herein by reference, which describes the characteristics of the IS32 Optic RAM, and gives both supplier information and a description of addressing circuits.

TECHNICAL FIELD

This invention relates to graphics input or output devices and more particularly to such a device including a fiber optic bundle.

BACKGROUND ART

Graphics input or output devices are well known in the art. One such device employing a linear array of photodiode sensors is commercially available from "Reticon" of Sunnyvale, Calif.

This array of photodiodes is positioned so that light impinging upon a document to be copied forms an image on the array through a suitable lens system. The document is moved by a control mechanism which synchronously strobes the array to provide signals representative of the linear image segment being scanned.

A problem with this type of arrangement is that a considerable distance is required between the array and the document in order to reduce the scanned image to a size compatible with the minute size of the array. Further, all the sensors have to be perfect and the signals provided by the array require additional means to store and convert the signals to digital form.

Graphic devices are known which employ fiber optic bundles to permit segments of a scanned image to be applied to minute sensor arrays without the considerable distance previously required. The signal output of such a fiber optic bundle still requires conversion to digital form and the fiber bundle has to provide physical coherence between the input and output (picture elements or pixels) such that the relationships between the signals at the input ends of the fibers and at the output ends of fibers are identical. The term "physical coherence" means that those relationships are maintained physically by keeping the fibers at the output end in a predetermined physical relationship with respect to the fibers at the input end. The requirement of coherence in a bundle of so many fibers of such small size is difficult to achieve and, therefore, costly.

DISCLOSURE OF THE INVENTION

An inexpensive graphics input or output device is achieved in a preferred embodiment by employing a bundle of optical fibers and a random access memory (RAM) which is adapted for sensing light signals. Such a memory is available commercially, is inexpensive and is known to be useful to sense light signals. One end of the fibers is constrained to form a linear array which can be used, for example, to scan a document. The other end of the array is merely gathered into at least one bundle, at random. The only constraint on the bundled end is that the cross sectional area of the bundle is configured to correspond generally with the area of the photosensitive RAM.

In this embodiment the diameter of each fiber is chosen to be large compared to the area of a bit location in the RAM. As a result, a plurality of RAM memory bits is positioned to correspond to a single pixel (Picture Element). Moreover, the number of fibers is chosen to be large (approximately 3000) compared to the number of pixels required for satisfactory optical definition. Consequently the input at the linear end of the array of fibers comprises 3000 signals and so provides high resolution, yet the signals at the sensor array end are of relatively low density compared to the density (64,000) of the available addressable memory locations in the sensor RAM. In this manner tolerances may be relaxed and costs reduced even though resolution is high. For example, if two mil diameter fibers are used, the linear input array will have a density of more than three thousand fibers over, say the width of a 8.5 inch letter size document. The output end could, in this example, be bundled into a rectangle of approximately 217×92 mils, which would perfectly match a commercially available 64 K Photosensitive RAM. This RAM can be purchased in OEM quantities for about $4.00, a price far lower than any other high density photosensitive device on the market today. Since the bundle of approximately 3000 fibers is physically abutted or optically focussed against the sensor RAM, each fiber corresponds to an area of the RAM occupying the space of about twenty addressable memory locations.

Coherence is preserved in this embodiment by employing a Look-up Table which can be incorporated into a computer program or embodied in a Programmable Read Only Memory (PROM) in a conventional manner. The Look-up Table records the correspondence between the position of each fiber in the linear input end and one of its associated addresses in the RAM to which it couples at the bundled end. The correspondence is determined upon manufacture by passing light through a narrow slit (smaller than the diameter of each fiber), which is oriented transversely to the linear array and is moved across the fibers of the array sequentially. As the slit passes each fiber, the corresponding illuminated RAM addresses are noted, and one address is chosen. The correspondence thus established is stored in a bit map, which may be recorded permanently in, for example, a PROM. Once the bit map is stored, the system is initialized for later use. Alternatively, the correspondence may be determined in the absence of a permanent built-in bit map by initializing the system each time the system is used, or, by using a computer program containing the Look-up Table.

The device can be used to scan a document for facsimile or for intelligent copier applications, as described, or in a reverse mode by coupling an imaging display to the bundled end, and by generating an image on the face of the display, in accordance with a bit map generated during initialization. In the printer embodiment the linear end may be abutted against a xerographic drum for selective discharge of linear segments of the drum as the drum rotates. The scanner, the printer, or both may be attached to a computer, such as a personal computer, having sufficient bit processing capability to provide facsimile or intelligent copier operation with relatively little adaptation.

DETAILED DESCRIPTION

Figure 1:
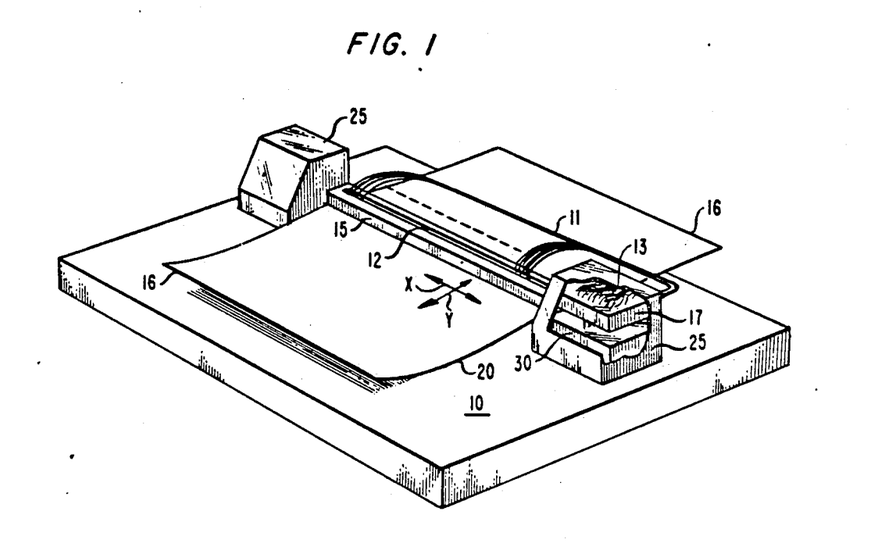
FIGS. 1, 4, 9, and 14 are schematic representations of systems in accordance with this invention.

FIG. 1 shows an illustrative portable graphics input device 10 in accordance with one aspect of this invention. The device comprises an optical fiber bundle 11 having first and second ends 12 and 13 respectively. The ends of the fibers at 12 are constrained, by ferrule 15 into a linear array positioned for scanning successive linear segments or lines of an image when moved with respect to a document 16, for example, along an axis aligned with double-headed arrow Y.

The ends of the fibers at 13 are not organized, but rather are gathered and bunched randomly, and fused. The fused bundle is abutted physically or focussed optically onto the surface of Random Access Memory (RAM) 17. The diameter of each fiber is chosen to be large compared to the area of a bit location in the RAM, so that twenty or so bits of the RAM correspond to each fiber at end 13. The choice of size ensures that any light entering a fiber at end 12 impinges at least one useable bit location of the RAM when it exits at end 13.

Coherence, that is, the ordered relationship, between the light signals entering the linear array of fibers at end 12 and light exiting the fibers at the bundled end 13 is provided by storing, in a Look-up Table in a computer, or by a Programmable Read Only memory (PROM), the address of a bit location in RAM 17 which senses light exiting a particular fiber at end 13 as light is directed into each of the fibers at end 12 in sequence.

Figure 2:
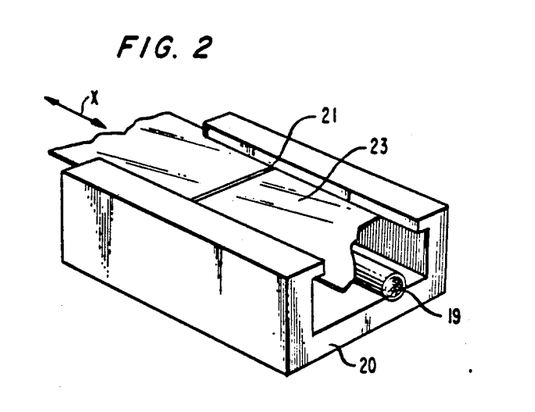
FIG. 2 is a schematic representation of a portion of an initializing apparatus in accordance with this invention.
Figure 3:
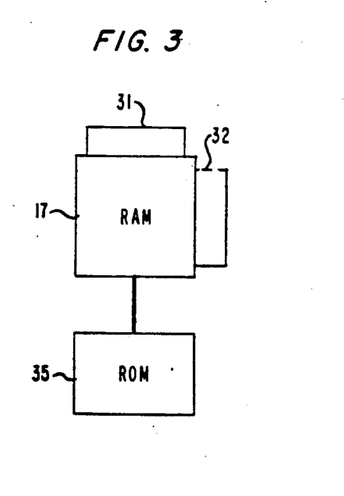
FIG. 3 is a schematic representation of a portion of the system in FIG. 1.

Initialization of an embodiment such as that shown in FIG. 1 is illustrated by the apparatus of FIGS. 2 and 3. The apparatus, includes a light source 19 enclosed by housing 20. A side of housing 20 in FIG. 2, is placed adjacent to ends 12 of FIG. 1 during an initialization process. The side 20 includes a slit 21 which, for example, may be formed in an opaque film or tape 23 which is moved along an axis, represented by double headed arrow X in FIGS. 1 and 2, in a manner to expose the fibers of the linear array at end 12, in sequence, to light. This causes the illumination of a sequence of bit locations in (sensor) RAM 17 of FIG. 3, corresponding to the sequence of fibers illuminated in the linear array. Slit 21 is narrow (less than a fiber diameter) and is progressively moved along the linear array in synchronism with the interrogation of the RAM 17, so that the bit map of each fiber is individually read out and recorded. The arrangement for moving slit 21 as required may be any convenient translation mechanism suitable for this purpose, and a detailed discussion of such an arrangement is not necessary for an understanding of this invention. All that is necessary is that a slit be passed along the fiber ends at 12 to illuminate the fibers in sequence to establish an appropriate Look-up Table or Bit Map during an initialization procedure. A suitable control circuit for controlling the movement of slit 21 and for controlling source 19 is represented by circuit board 30 in FIG. 1. The apparatus to accomplish initialization can be included as part of the apparatus of FIG. 1, or may be a separate dedicated fixture as shown in FIG. 2.

RAM 17 includes X and Y address decoders 31 and 32 in a familiar manner as indicated in FIG. 3. All bit locations in the RAM are initialized or precharged prior to each "interrogation" cycle, in which all bits are interrogated to determine which address was illuminated when light enters the next consecutive fiber during the initialization process. Specifically, incident light discharges the bit location (or locations) of the RAM corresponding to the fiber at end 12 which is illuminated at any given instant during the initialization process. The RAM is then interrogated and the address (or addresses) of the discharged bit location (or locations) is stored in the Look-up Table or Read Only memory (ROM) 35 under the control of control circuit 30 of FIG. 1. At the termination of the initialization process, the addresses of all the consecutively discharged bit locations of RAM 17 are stored. This procedure establishes the coherence between the randomly gathered fiber ends at 13 and the linear arrangement of fiber ends at 12. The system is now ready for operation.

As noted, each fiber, preferably, is larger in diameter than the area occupied by a group of bit locations in the (sensor) RAM. This relationship ensures that at least one unambiguous bit location in the sensor RAM will be illuminated during each interrogation cycle, and that a defect in the RAM will not cause loss of information. The redundancy of about 10 to 20 bit locations, corresponding to a single fiber, was selected for convenience because of the economy and availability of 64K RAMs, and the excellent resolution, economy and general utility of the device using 2 mil fibers. Practical consequences of this choice will be discussed below, in relation to FIGS. 9 and 11. A lower level of redundancy may be chosen, without sacrificing required resolution by varying the RAM size or geometry, the fiber size, or other characteristics.

A suitable sensor RAM for the embodiment disclosed is available commercially from Micron Technology Inc., of Boise, Id. The RAM is divided into two sections, each 256 by 128 cells. Accordingly, it is convenient in the illustrative embodiment to divide the fibers at end 13 into two arrays to associate with the two sections of the RAM if the Micron Technologies RAM is used. Appendix II describes in detail the address structure of the Micron Technology IS32 Optic RAM and circuitry for its use. For speed of operation, it may be desirable to divide the fibers into a greater number of sections to reduce the addressing requirements.

A complete system for entering graphics information into a computer using such a sensor RAM is disclosed in detail in the September 1983 issue of Byte Magazine at pp. 20-31. the computer interfaces and control software for the system are described in the October issue of that same publication at pp. 67-86. These two articles are attached hereto as Appendix I, and are hereby incorporated by reference and made of record. The present invention can be used with the system described in those publications, by providing, in addition, the herein-described fiber optic array, a sensor array, and a memory for storing a Look-up Table or Bit Map.

Figure 4:
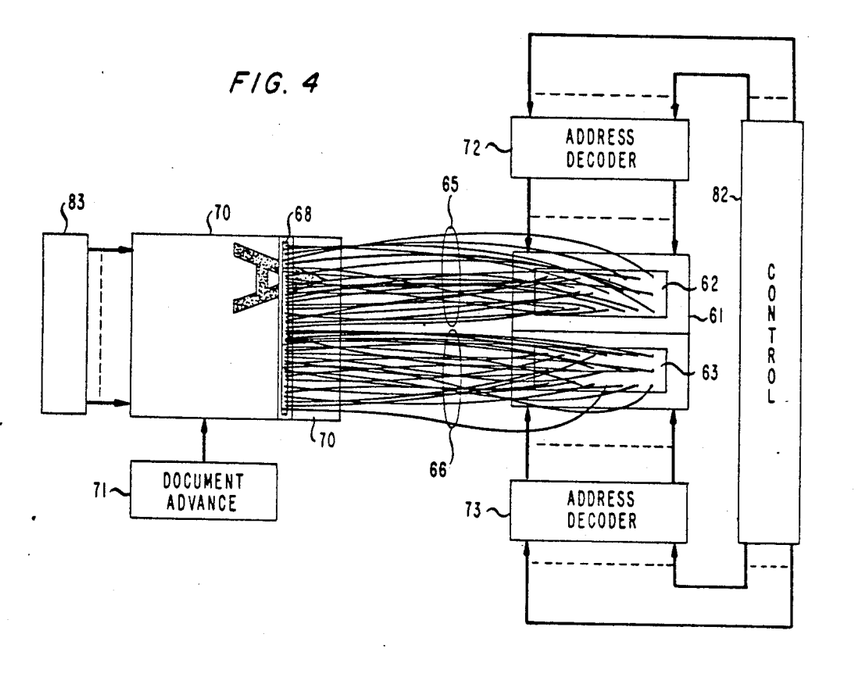

FIG. 4 shows schematically an arrangement of the type shown in FIGS. 1 and 3 for use with the system of the above-mentioned publications. The arrangement includes RAM chip 61 divided into two sections 62 and 63 as is available commercially. Sections 62 and 63 are mated with randomly-bundled fiber arrays 65 and 66 respectively. The other ends of the fibers are constrained to a linear geometry by ferrule 68 and positioned to scan a portion of a document, shown by way of illustration as the letter A on document 70. A means for advancing document 70 is represented by block 71 and may comprise, for example, a mechanism like that used in the Houston Instruments DMP-4 plotter. Houston Instruments is a division of Bausch & Lomb. RAM 61 is addressed by address decoders 72 and 73 under the control of a Look-up Table implemented as part of a computer or by a familiar PROM providing a bit map. The addressing control arrangement is represented by block 82.

Figure 5:
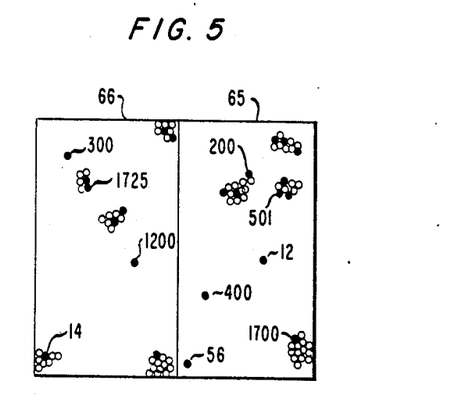
FIG. 5 is a schematic representation of a random distribution of light signals in a non-coherent fiber bundle.

The linear array in FIG. 4 is shown intersecting a letter "A" on document 70. In the absence of a Look-up Table or Bit Map, noncoherence between the input and output array produces a random distribution of the light signals input to the linear array of fibers. That distribution is shown as it appears from the output as represented in FIG. 5. FIG. 5 specifically, represents the random distribution by numbers of associated fibers in the linear array placed with respect to possible positions of the associated other ends of those fibers in array sections 62 and 63. It is clear that the interrogation of RAM sections 62 and 63 could make no sense of the input signals in the absence of a Look-up Table.

But a Look-up Table or Bit Map which stores the relationship between the input of fibers 1,2,3, ... and the addresses in RAM 61 associated with the output ends of those fibers, would enable sense to be made of the random distribution by controlling the RAM address decoders to take the output sensed at the stored addresses in a sequential relationship identical to that in the linear array. Consequently, during a scan period when light directs signals into the fibers at 68 in FIG. 4 from a linear segment of the document, the Look-up Table or Bit Map 82 of FIG. 4 applies a sequence of addresses to interrogate the memory in order to generate output signals coherent with the fiber positions at 68. Next, document 70 is advanced incrementally with respect to ferrule 68, and RAM 61 is interrogated again in accordance with the Look-up Table or Bit Map. The process is repeated until the document is entirely scanned. The apparatus of FIG. 1 is assumed to include a lamp (not shown) for illuminating the document. Provision for illumination may correspond to that provided in any familiar copier. The illumination means is represented by block 83 in FIG. 4.

The following Table 1 represents a Look-up Table or Bit map for an illustrative six fibers. It should be clear that the operation of the RAM interrogation according to the Look-up Table during each scan period is entirely consistent with the operation described in the above mentioned publications. But the results are considerably different because the optical input received by the RAM during each interrogation is effectively a randomly dissected linear input distributed over the entire (sensor) RAM—instead of a line from the array being laid out on a line of the sensor, as it would be in the case of a direct lens projected image. It is clear that resolution is significantly improved.

| Look-up Table Fragment Diagram | |
|---|---|
| Input Array Fiber | Output Array Associated RAM Address |
| 507 | 4122 |
| 508 | 73 |
| 509 | 2413 |
| 510 | 62117 |
| 511 | 12540 |
| 512 | 989 |

The input fiber numbers shown, constitute, illustratively, a fragment taken from the 0–3000 sequence of fibers and shows one related RAM address for each fiber. The RAM addresses are chosen, illustratively, from the 10 or 20 addresses corresponding to a given fiber in such a way that the chosen address for each fiber is at least 20 cells away from the RAM address of nearby fibers.

The operation of a scanner embodying the principles of this invention can be understood by proceeding as follows: First the linear end of the fiber bundle is juxtaposed with a first line (or linear segment) of a docment to be scanned. A light source illuminates the document (possibly by being strobed), and the storage means for storing the Look-up Table or Bit Map is activated for applying the sequence of stored addresses to the (sensor) RAM in order to read the incoming light signals (presence or absence of light) in each of the sequence of fibers corresponding to the sequence of RAM addresses interrogated. Since the generated sequence of RAM addresses corresponds to the sequence of fibers in the linear end of the bundle, the light signal outputs are coherent. These output signals are stored in memory, or transmitted, or both, in a manner entirely consistent with the teachings of the above-mentioned Byte Magazine articles.

A fiber optic bundle configured linearly at one end and randomly in a square or rectangular array at the other can be used for printing with the output at the linear end. In order to adapt the above electronically-controlled coherence arrangement to printing, the face plate of a high intensity display (e.g. a cathode ray tube) is juxtaposed against the randomly gathered rectangular end of the fiber bundle. The electron beam of the tube is moved to successive positions on the face plate according to a Bit Map generated during an initializing procedure as described above. But a (sensor) RAM is not used in the printer as was the case with the scanner. Rather, the Bit Map controls the consecutive positions of the beam with respect to the tube face. Since the fibers are abutted (physically or optically) against the face plate, light signals are directed to consecutive fibers in a manner to provide coherent information at the linear array end of the fibers. The linear array is juxtaposed optically with, for example, a xerographic drum, for selectively discharging the drum for printing. The printing system is depicted in FIGS. 6, 7 and 8.

Figure 6:
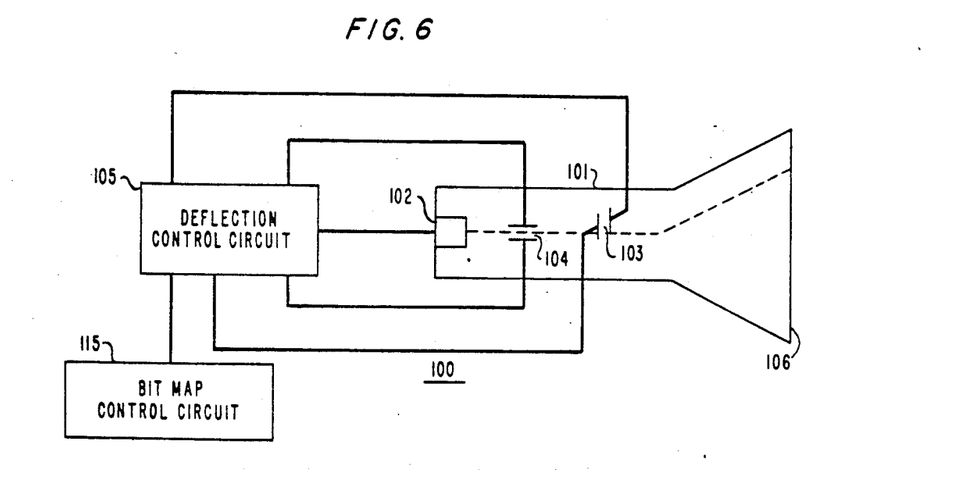
FIGS. 6, 7, and 8 are schematic representations of portions of a graphic printer in accordance with this invention.

FIG. 6 shows a portion 100 of a printer in accordance with the principles of the present invention. The printer comprises a cathode ray tube (CRT) 101 including a cathode 102 for generating electrons and X and Y deflection plates 103 and 104 respectively. The X and Y deflection plates are operative in response to voltages applied to the plates by deflection control circuit 105 normally to scan a line from side to side on the face 106 of the plate and then to increment to the next line for repeating the operation until the entire face is scanned. The presence or absence of electrons in each position in a line determines whether the phosphor on the inside of the face plate emits light or not. Alternatively, a CRT of different construction in which the beam can be vectored to sequentially specified positions on the tube face can be used.

Figure 7:
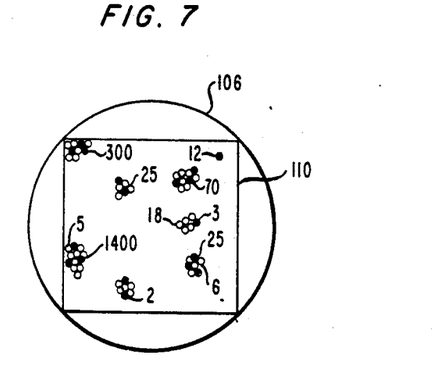

FIG. 7 shows a front view of face plate 106 of the CRT of FIG. 6. Superimposed on face plate 106 is the end 110 of a fused bundle of fibers (which could also be a circle). The physical structure is similar to that achieved by, for instance, extending the fibers of the fiber optic face plate of U.S. Pat. No. 3,273,445 issued Sept. 20, 1966 to W. P. Siegmund, and gathering them in a bundle as shown in U.S. Pat. No. 4,060,307 issued Nov. 29, 1977 to Demaine et al. The remote end of the bundle of fibers is configured in a linear array by ferrule 111 as shown in FIG. 8. We have established above how the coherence between the randomly bundled end of a bundle of fibers and a linearly arrayed opposite end of those fibers is obtained during an initialization procedure and maintained electronically. We will assume for illustrative purposes that a bit map is employed to store the relationship between the positions at the two ends of the fiber bundle. Such a bit map is provided in bit map control circuit 115 of FIG. 6. Circuit 115 is operative to control deflection control circuit 105 to direct desired information to a specified spot on face 106 so that the information enters the proper fiber in bundle 110 of FIG. 8. In turn, the proper output is in the correct position in the linear array end of the fibers as shown in FIG. 8. A suitable vector CRT for this purpose is available commercially from General Consumer Electronics Corporation (GGE) in Santa Monica, Calif.

Figure 8:
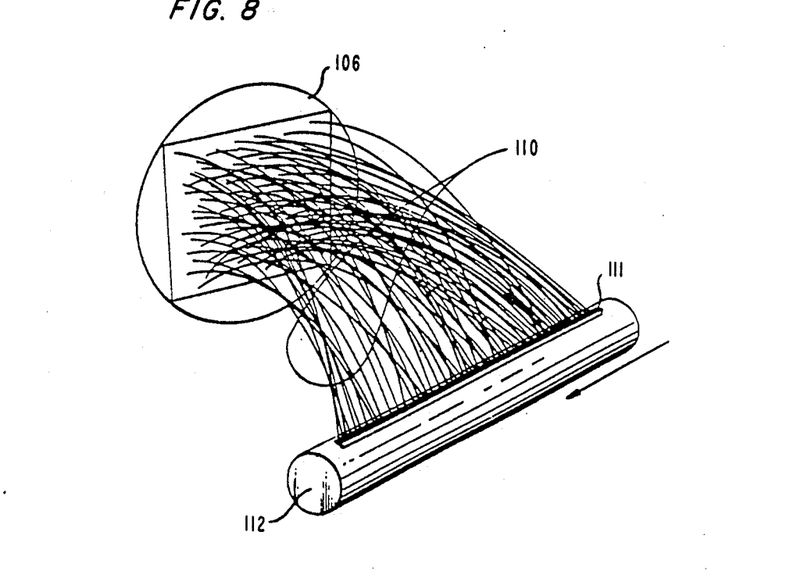

The linear array is juxtaposed with a drum 112 of a copier, as shown in FIG. 8. One suitable copier arrangement which can be adapted conveniently to this end is disclosed in U.S. Pat. No. 4,332,458, issued to L. B. Hoffman June 1, 1982. The optical system of the device shown in that patent is replaced by a fiber optic bundle arranged so that the linear end is juxtaposed against the drum and the randomly bundled end is juxtaposed against the light input to the copier as shown in FIG. 6. In addition, the paper transport (original) is omitted as is the light source in that patent. Instead CRT face plate 106 is abutted against the bundled end of the fibers.

The printer operation is as follows: The beam of a CRT is directed to the sequence of (3000) addresses, stored during initialization, and the beam of the CRT (102 of FIG. 6) is either activated or not in each instance according to the image to be printed. The light signal in each instance is applied, via the fiber bundle, to discharge the drum. When the entire sequence of addresses is completed, the drum is rotated to a next linear position and the sequence of addresses is again applied to the CRT for directing the light signals again. The process is repeated until the entire document is recorded on the drum. What is described herein illustratively produces resolution far beyond what is presently available from non-laser printers. Yet presently available electronics and CRTs provide sufficient speed of operation and light intensities to produce high quality systems as disclosed herein, at low cost.

We have now described the general organization and operation of a scanner and a printer utilizing a randomly organized fiber bundle having an electronic means for achieving coherence. Now we will describe the electronic organization of the scanner and printer.

Figure 9:
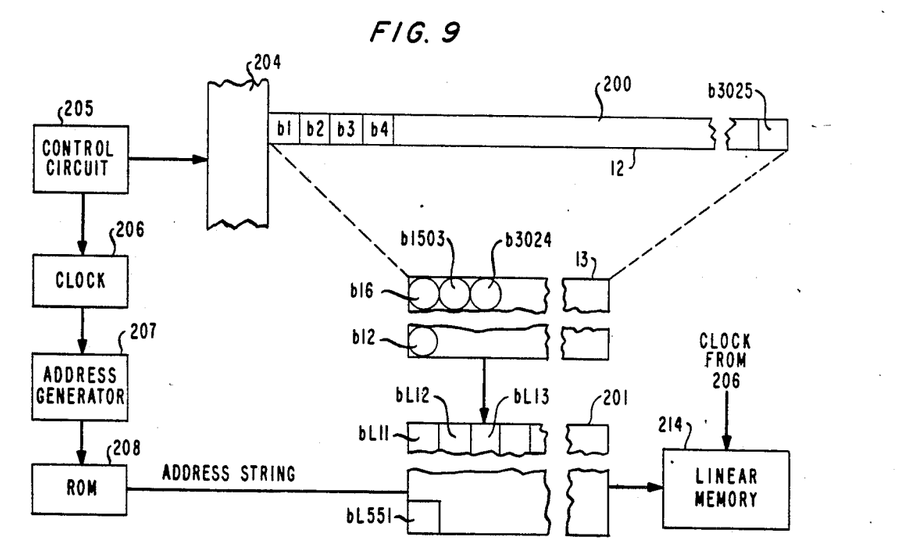
Figure 10:
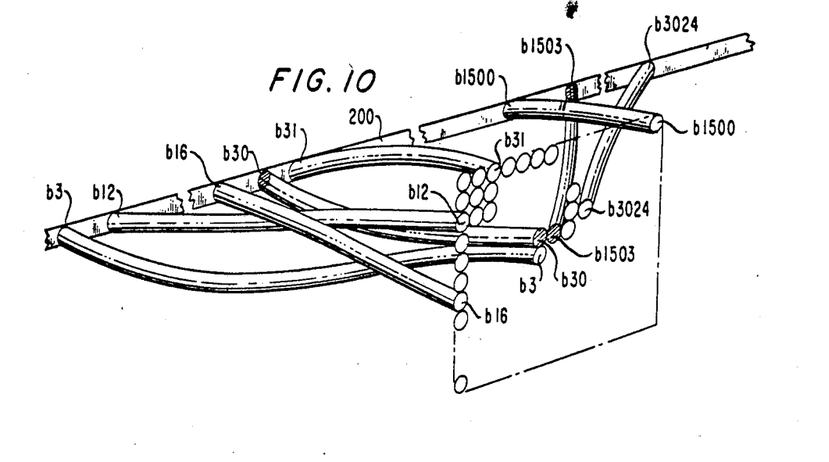
FIGS. 10, 11, and 12 are schematic representations of portions of the scanner arrangement of FIG. 9.

FIG. 9 is schematic block diagram of the organization of the scanner of FIG. 1. Rectangle 200 represents a linear segment (line) of a document illustratively 8.5 inches in width and one fiber in height. The blocks within the linear slice are numbered from left to right as viewed b1, b2, b3, ... b3025. This slice is scanned by the sequentially ordered fibers at end 12 of the fiber bundle, and the light signals detected thereby are channelled via the fibers to randomly bundled end 13, which is shown labelled according to the ordering of the fibers at end 12. The light pattern entering from the linear segment of the document is, of course, scrambled when it exits the other end of the fiber. FIG. 10 shows how such a scrambling occurs. In the figure, representative fibers along the segment are shaded, b16, b30, b31 and b1503, and others, b3, b12, b1500 and b3024 are shown unshaded to represent dark and light areas along the segment respectively. The remote (bundled) end of the fibers are designated to correspond. The lack of coherence is clear.

Figures 11, 12, 13:
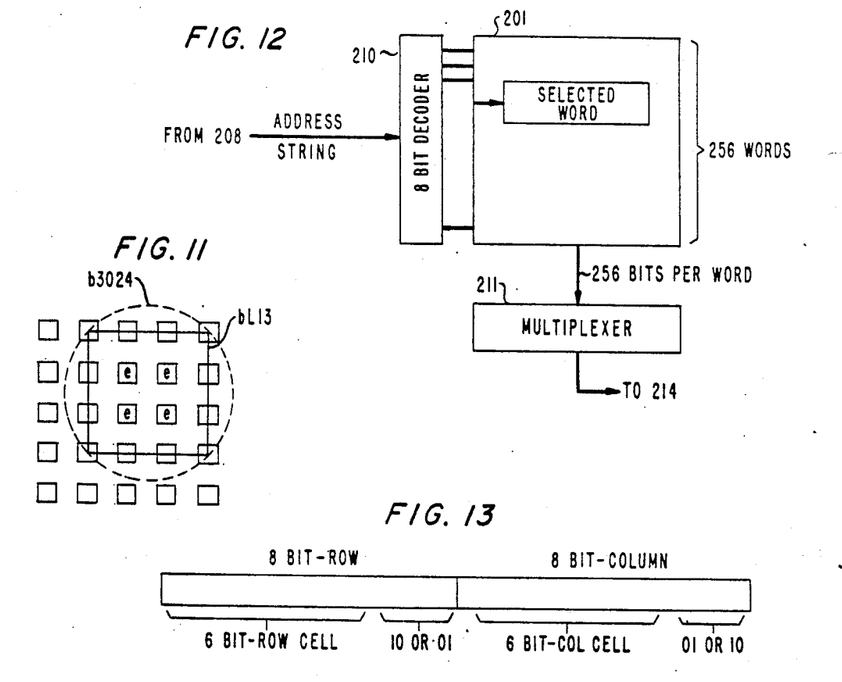
FIG. 13 is a schematic representation of the addressing organization for blocks of bit locations in RAM in the systems of FIGS. 1, 4, 9, or 14.

Returning to FIG. 9, we see that the bundled end of the fibers is attached (in one embodiment) to the face of random access memory RAM 201. During initialization RAM 201 is organized illustratively, into fifty five rows of fifty five blocks of bit locations which, when multiplied out yields 3025, the number of fibers in the embodiment of FIG. 9, with each fiber in the bundle corresponding in position to one of the blocks of bit locations in RAM 201. FIG. 11 shows a representative fiber b3024 superimposed on a representative block designated bL13. As shown block bL13 includes a plurality of sensor elements e of the regular array of elements on the RAM, some of which correspond with the edges of fiber b3024, and others with the center region of the fiber end. During initialization a central element may be chosen as representative of the block bL13.

The linear end of the fibers is moved, with respect to a document, as indicated in FIG. 1 by a suitable mechanical arrangement represented by block 204 in FIG. 9. One suitable mechanical arrangement is shown in the above-mentioned U.S. Pat. No. 4,332,458. The mechanical arrangement is operated under the control of a control circuit 205 which is clocked by clock source 206.

Clock source 206 also enables the generation of a string of RAM addresses corresponding to the sequence b1, b2, b3, b3025 of the linear array end of the fibers. To this end, the scanner of FIG. 9 includes an address generator 207, the output of which is connected to a read only memory (ROM) 208. An output from clock 206 is connected to address generator 207. Each clock pulse is operative to activate control circuit 205 to move the linear array to a next scan position and simultaneously to increment address generator 207. Each clock pulse thus causes the address generator to scan through the 3025 bit map addresses stored in ROM, addressed 0 through 3025.

Address generator 207, in response, applies an address to ROM 208. ROM 208 responds, in a well understood manner, to generate the address string corresponding to the sequence of fibers at the linear array end as stored during initialization. The address string is applied to RAM 201 by means of an eight bit decoder 210, as shown in FIG. 12. The decoder is operative, in the usual manner, to select a particular word in RAM 201. Each time a clock pulse occurs, the linear end of the array scans a next segment of the document and ROM 208 applies an address string to decoder 210. Each address of the address string selects a word in RAM 201 and applies the 256 bits of the selected word to multiplexer (MUX) 211. MUX 211 is a 256 to 1 MUX and is operative to apply a binary 1 or 0 to linear memory 214 of FIG. 9 depending upon whether the selected block of bit addresses (i.e., bL13 of FIG. 11) is illuminated or not in the instant scan period. Linear memory 214 also receives clock pulses from clock 206 for incrementing to a next of fifty five positions, each for storing fifty five bits (1 or 0) representing the presence and absence of light incident upon the consecutive blocks (bL13 of FIG. 11) addressed by the address string during each scan period.

Note that the 3025 fibers cover virtually the entire RAM. Because the 64K bit RAM is organized into only 3025 blocks, as already indicated, each fiber corresponds to about twenty or so bit locations as was mentioned hereinbefore. In a preferred embodiment it is convenient to take the address of the center bit location of the block in each instance. The center bit location generally will be fully illuminated when the corresponding fiber is illuminated, unlike the edge bit locations which may be only partially illuminated. Thus illumination of the center bit is more reliably correlated with illumination of the fiber. If we use a sixteen bit address from generator 207 of FIG. 9, eight bits of the address select the row of the RAM and eight bits select the column. We can take six bits to select a block in a row and six bits to select a block in a column, leaving two bits in each instance. The remaining two bits, as shown in FIG. 13 determine the offset from the corner of the selected block to the approximate center of that block. In this manner, the address of the center of a block is identified with relatively few address bits.

While only one bit position of the sensor RAM may be adequate and actually used, the point of having many bit locations available is to be able to configure the RAM, during initialization, so that each fiber illuminated equally will cause an output from the RAM that is equal in intensity. Since such RAMs or other sensor arrays (CCDs) may be less than perfect, having the ability to arrange all of the illuminated bit locations corresponding to each fiber permits one to use chips containing defective sensor elements. The ability to average (or to use sensor bit location selection) to correct for variation in fiber transmissive ability is also helpful to achieve high quality at low cost.

The operation proceeds quickly to allow the scanning of a typical document (8.5"×11") in 3915 scan periods. The addresses required during each scan period can be generated in less than 1.7 nanoseconds. Consequently, each scan period takes 1.7 nanoseconds, and the entire document can be scanned far faster than by many currently available facsimile, copier, or printer devices.

For implementing the printer of FIG. 6, the fiber bundle end to the right as viewed in FIG. 10 is attached to the face plate of CRT 101 of FIG. 6 rather than to the face of a Random Access Memory. The control arrangement for generating an address string is operative to control the deflection plates inside the CRT as indicated in FIG. 6 so as to produce a scrambled image on face plate 106 of the CRT in FIG. 7. Light signals are directed to fibers at the bundled end (to the right in FIG. 10), and they exit, unscrambled at the linear array (to the left in FIG. 10). The linear end is juxtaposed with the copier drum as discussed hereinbefore and shown in FIG. 8.

The control arrangement for directing stored signals to the proper fiber at the face of the CRT for printing will now be discussed in connection with FIG. 14. The object of the control is to apply an address string from ROM to the deflection control circuit of the CRT to generate the sequence of positions to which the electron beam of the CRT is to be vectored (or fired if in Raster Scan Mode).

Figure 14:
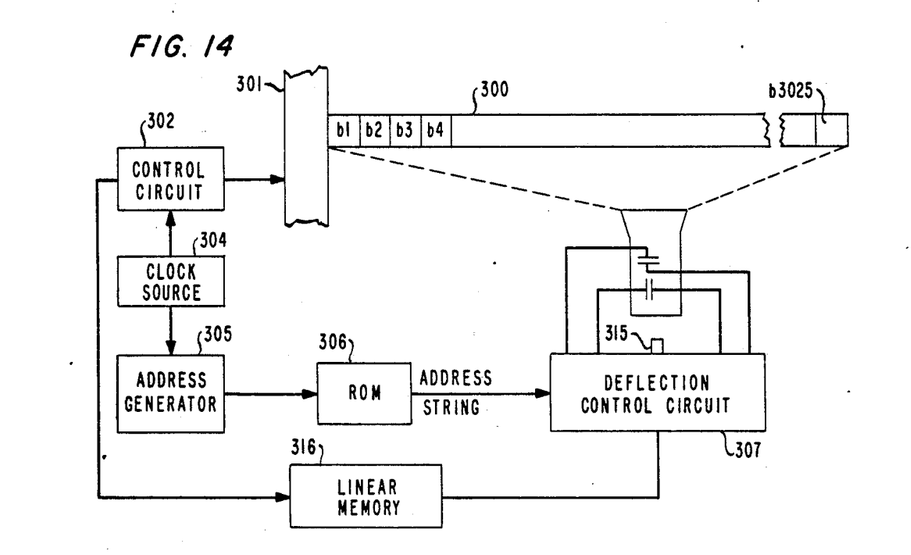

FIG. 14 shows the linear array 300 of fibers to be juxtaposed with a drum as shown in FIG. 8. The mechanical apparatus for moving the array with respect to a document is represented by block 301. Control circuit 302 is operative to increment the relative positions of the linear array and a document (not shown) in response to a clock pulse. A source of clock pulses is represented by block 304.

Figure 15:
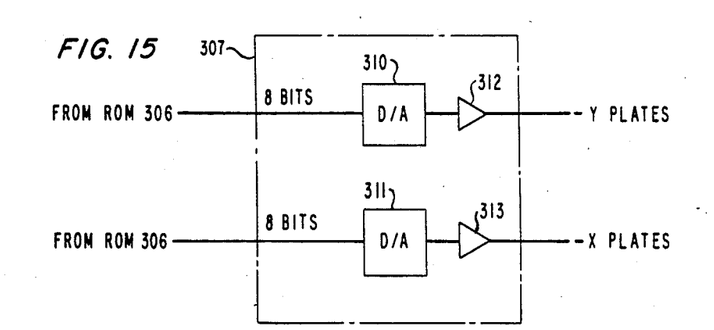
FIGS. 15 and 16 are schematic representations of the system of FIG. 14.

The clock source also increments an address generator 305 which applies an address to ROM 306. ROM 306 responds by applying an address string to the deflection control circuit 307. FIG. 15 shows a portion of the deflection control circuit 307. The circuit includes two eight bit digital to analog (D/A) converters 310 and 311. Each converter is followed by an amplifier, 312 and 313 respectively for providing voltages to the y and x plates as indicated.

Each D/A converter is responsive to an eight bit word of the type represented in FIG. 13 and included in each of the addresses of the address string applied by the ROM. Thus, the string of addresses is operative to move the beam to consecutive positions in the fiber bundle array (viz to the right as viewed in FIG. 10). The presence or absence of the beam in each of those positions dictates whether a binary 1 or 0 is supplied. The activation or deactivation of the beam from source 315 is responsive to the output of linear memory 316 to this end.

Figure 16:
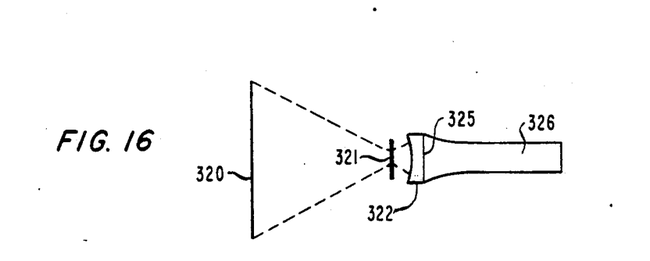

The inclusion of a lens between the fiber bundle and the face plate of the CRT provides additional advantages in terms of brightness and resolution. FIG. 16 shows such an arrangement including a lens. The linear array end of a fiber bundle is represented by line 320. The bundled end is represented by line 321 of much reduced dimension. Lens 322 focuses the image of face plate 325 of CRT 326 down to the size of the fiber optic bundle. The lens allows greater flexibility in size of the CRT and reduces the accuracy requirements on the electron beam position and size (the beam size actually can be quite large—2 to 4 times the fiber size and greater). The light energy required to discharge a xerographic drum varies from 5 to 50 ergs/cm. Currently available CRTs provide sufficient light energy to accomplish such discharge, while document scanning is carried out at rates of speed which are high compared to presently available facsimile or copy equipment.

It is not necessary to employ a CRT to achieve the advantage of this invention. A light source with a light valve array such as a liquid crystal array may be substituted for the CRT. Also an array of light emitting diodes may be employed.

Of course, once graphics information has been stored in a suitable digital medium (and many personal computers may be adequate for such purposes when properly equipped), that information can be manipulated to provide intelligent copier operation prior to printing. In some instances, manipulation of the information may be accomplished by means of available software or a suitable modification thereof. The storage size of the document also can be reduced or enlarged (by well-known electronic compression/expansion means), providing a capability similar to microfilm.

In addition, a scanner employing a fiber bundle in accordance with the principles of this invention can be quite small and thus portable. The entire scanner can be configured like a wand so that, together with a feed mechanism, an assembly approximately ½ inch by 3 inches by 9 to 10 inches may form an entire scanner, for optical character recognition (OCR) or in-library electronic microfilming applications.

Although the invention has been described in terms of a specific sensor array, it is to be understood that any photosensor that can be read out on a specific location basis can be used. Consequently, devices such as CCDs, CIDs, photodiodes, Vidicon, Plumbicon, and the like may be employed. Similarly, any addressable light source, of which a CRT is illustrative, may be used for printing embodiments.

What is claimed is:

1. A combination of elements comprising:
   a non-coherent fiber optic bundle having first and second ends arrayed in first and second geometries, respectively, said first end being adapted to receive a pattern of optical radiation input signals representative of data,
   a randon access photo-sensor array energy coupled to said bundle at said second end, said random access photo-sensor array comprising a given number of sensors, each sensor having a distinct address,
   memory means coupled to said random access photo-sensor array for storing a string of sensor addresses, said string comprising addresses corresponding to fibers in said bundle, the number of addresses in said string being less than said number of available sensor addresses, and
   control means for causing the interrogation of the random access photo-senser array addresses in said string in a sequence to reconstruct the pattern of input signals present at the first end of said bundle.

2. A combination in accordance with claim 1 including means for constraining the fibers of said first end into a first geometry which comprises a linear array.

3. A combination in accordance with claim 1 including means for constraining the fibers of said first end into a first geometry which comprises a rectangular array.

4. A combination in accordance with claim 2 including means for constraining the fibers of said second end into a rectangular array.

5. A combination in accordance with claim 1 also including menas juxtaposed with the fibers of said first end for moving a document with respect to those fibers, and radiation means for exposing at least a linear portion of said document for generating said input signals.

6. A combination in accordance with claim 3 also including means for constraining said fibers at said second end into a second geometry of linear configuration.

7. A combination of elements comprising:
   a fiber optic bundle having first and second ends,
   means for constraining the first ends of said fibers in a linear array in a manner to permit exposure of said fibers to a pattern of input signals formed form electromagnetic radiation,
   radiation sensing means energy coupled to said second end and comprising a random access photo-sensor array including a plurality of sensing elements having distinct addresses,
   storage means coupled to said random access sensor array for storing a string of sensor addresses corresponding to fibers in said bundle, the number of addresses in said string being less than the total number of available sensor addresses, and
   control means coupled to said storage means and adapted to cause the interrogation of said string of addresses to associate optical signals emerging from said fiber bundle with signals.

8. A combination in accordance with claim 7 also including first means for moving said linear array transversely with respect to an initial linear reference position.

9. A combination in accordance with claim 8 wherein said first means comprises means for moving said linear array incrementally with respect to a sheet of paper on which said initial linear reference position is defined.

10. A combination in accordance with claim 9 also including means for applying to said memory means said string of addresses between consecutive ones of said incremental movements of said linear array, and means for storing signal output from said interrupted sensor addresses representative of the presence or absence of radiation in corresponding fibers.

11. A combination of elements for establishing positional correspondence between input signals applied to fibers at an input end of a fiber optic bundle and the corresponding output signals at the otuput end of said bundle, said combination including
   means for generating a beam of radiation having a width smaller than the diameter of the fibers in said bundle and for moving said beam along a path including the input ends of the fibers,
   a random access photo-sensor array energy coupled to the output end of said fiber bundle, said sensor array comprising a given number of sensors, each of said sensors having a characteristic address in said array, said array being positioned so that as said beam is moved along said path, a plurality of corresponding sensors may be illuminated, and
   memory means coupled to said random access photo-senser array for storing a string of addresses corresponding to fibers in said bundle, said string having a smaller number of addresses than the given number of addresses available in said sensor array.

12. A combination of elements comprising:
   a non-coherent fiber optic bundle comprising fibers having first and second ends,
   means for constraining the first ends of said fibers in a linear array in a manner to permit exposure of said first fiber ends to a pattern of input signals formed from electromagnetic radiation,
   a random access array of photo-sensors energy coupled to aid fiber bundle at said second ends, said random access array comprising a given number of discrete sensors, each having a characteristic address,
   memory means coupled to said random access array for storing a string of sensor addresses corresponding to fibers in said bundle, the number of addresses in said string being less than said given number of available sensor addresses, and
   control means coupled to said memory means for causing the interrogation of the addresses in said string in an order corresponding to the sequence of first fiber ends in said linear array to reconstruct the pattern of input signals present at the first fiber ends.

13. The combination of claim 1 wherein said sensor array is about a size to correspond to the optical image exiting the second end of the fiber optic bundle.

14. The combination of claim 7 wherein said sensor array is about a size to correspond to the optical image exiting the second end of the fiber optic bundle.

* * * * *